United States Patent [19]
Searle et al.

[11] Patent Number: 6,106,950
[45] Date of Patent: Aug. 22, 2000

[54] WATERBORNE PRIMER AND OXYGEN BARRIER COATING WITH IMPROVED ADHESION

[75] Inventors: Brenda C. Searle, Vancouver, Wash.; Leonard C. Jannusch, White Bear Lake, Minn.; Thomas E. Rolando, Maple Grove, Minn.; Peter A. Voss, St. Paul, Minn.; Craig P. Copping, Markham, Canada

[73] Assignee: H. B. Fuller Licesing & Financing Inc., St. Paul, Minn.

[21] Appl. No.: 09/090,472

[22] Filed: Jun. 4, 1998

[51] Int. Cl.[7] .......................... B32B 27/00; B32B 27/40; A22C 13/00; B29D 22/00; B29D 23/00
[52] U.S. Cl. .................. 428/423.1; 427/372.2; 427/385.5; 428/34.8; 428/35.4; 428/36.7; 428/423.5; 428/423.7
[58] Field of Search ............... 428/423.1, 34.8, 428/35.4, 36.7, 423.5, 423.7; 427/372.2, 385.5

[56] References Cited

U.S. PATENT DOCUMENTS

| | | |
|---|---|---|
| 4,214,039 | 7/1980 | Steiner et al. . |
| 4,927,689 | 5/1990 | Markiewicz . |
| 5,230,963 | 7/1993 | Knoerzer . |
| 5,512,338 | 4/1996 | Bianchini et al. . |

*Primary Examiner*—Patrick D. Niland

[57] ABSTRACT

The present invention relates to oxygen barrier film structures and a method of using thereof. More particularly, the invention relates to oxygen barrier film structures comprising at least one substrate, a primer layer on at least one surface of the substrate, said primer comprising a mixture of at least one aqueous dispersion of polyurethane (A) and at least one water dispersible crosslinking agent (B); an oxygen and moisture resistant barrier coating onto said primer treated surface of the polymeric substrate; said coating comprising a mixture of at least one aqueous polyvinyl alcohol or its copolymers (C) and at least one crosslinking agent (D). Improved adhesion properties of the barrier coating on substrates such as polyolefin, polyester and polyamide are obtained.

22 Claims, No Drawings

WATERBORNE PRIMER AND OXYGEN BARRIER COATING WITH IMPROVED ADHESION

FIELD OF INVENTION

The present invention generally relates to oxygen and moisture resistant barrier film structures with improved oxygen and moisture barrier characteristics. More particularly, the invention relates to oxygen and moisture resistant barrier film structures comprising at least one substrate, a primer layer formed by coating at least one surface of the substrate with a primer composition comprising at least one aqueous dispersion of polyurethane (A) and at least one water dispersible crosslinking agent (B); an oxygen and moisture resistant barrier formed by coating onto said primer treated surface of the substrate, a barrier coating composition comprising at least one aqueous polyvinyl alcohol or its copolymers (C) and at least one crosslinking agent (D).

BACKGROUND OF THE INVENTION

Polyolefin films such as polyethylene and polypropylene are commonly employed packaging materials because of their relative low cost, heat sealability and moisture resistance. However, these polyolefins have a fairly high permeability to gases including oxygen. These polyolefins are not adequate for packaging oxygen sensitive foods and other materials that degrade in the presence of oxygen or other atmospheric gases.

It is also known that polvinyl alcohol (PVOH) and its copolymers have excellent resistance to permeation of gases, particularly oxygen. However, they involve a drawback that their oxygen gas barrier property is impaired to a great extent due to moisture absorption under high relative humidity conditions. In addition, they are easy to dissolve in boiling water. Moreover, they do not bond well to many polymer films, particularly polyolefin films.

A number of methods have been known to increase the water resistance of PVOH and its copolymers. None of these methods provided entirely satisfactory results inspite of the various methods such as crosslinking PVOH with potassium dichromate, formaldehyde or phenol formaldehyde resins. PVOH still tends to soften, swell and lose adhering strength when exposed to water or even moisture vapor.

Knoerzer, U.S. Pat. No. 5,230,963 discloses oxygen and water vapor transmission resistant film comprising a maleic acid anhydride modified polypropylene films coated with aqueous polyvinyl alcohol containing melamine fomaldehyde as a crosslinking agent.

Steiner et al., U.S. Pat. No. 4,214,039 is directed to a polypropylene film having a primer comprising water dispersed epoxy resin coating and a water soluble amine modified acrylic resin applied to the treated oriented polypropylene, topcoated with an aqueous dispersion of vinylidene chloride multipolymer and subsequently dried to produce a coated packaging film.

Bianchini et al., U.S. Pat. No. 5,521,338 disclose barrier film structures comprising polyvinyl alcohol as an oxygen barrier with an aldehyde containing crosslinking agent in the presence of a catalytic amount of sulfuric acid and coated with a moisture barrier comprising polyvinylidene chloride. However, chlorine gas which is attributable to the chlorine in polyvinylidene is generated upon its incineration in waste treatment.

Markiewicz, U.S. Pat. No. 4,927,689 is directed to gas barrier structures which comprises a thermoplastic polymeric layer having two coatings on one side of the base layer. The first coating is a solvent based two component urethane primer and the second coating comprising polyvinyl alcohol as a barrier material. A drawback involves the use of organic solvent which is an environmental hazard.

There remains a need for an oxygen and moisture resistant film structure which overcomes the drawbacks of the prior art. Surprisingly, the oxygen and moisture resistant film structures of the present invention exhibit excellent oxygen gas barrier property under low relative humidity, as well as high relative humidity conditions, improved bond strength, moisture resistance properties and storage stability as compared to other film structures.

SUMMARY OF THE INVENTION

The present invention provides oxygen and moisture resistant barrier film structures comprising at least one substrate, a primer layer formed by coating at least one surface of the substrate with a primer composition comprising at least one aqueous dispersion of polyurethane (A) and at least one water dispersible crosslinking agent (B); an oxygen and moisture resistant barrier formed by coating onto said primed treated surface of the substrate, a barrier coating composition comprising at least one aqueous polyvinyl alcohol or its copolymers (C) and at least one crosslinking agent (I)).

A further aspect of the present invention is to provide better adhesion of the oxygen and moisture resistant barrier coating to a polyolefin substrate using a primer composition comprising at least one aqueous dispersion of polyurethane and at least one water dispersible crosslinking agent.

Another aspect of the present invention is to provide film structures having an improved oxygen barrier firmly bonded to a primer treated substrate. The film structures are produced by coating at least one side of the primer treated substrate with an aqueous solution of polyvinyl alcohol and its copolymers and at least one crosslinking agent providing an oxygen barrier layer which resists the transmission of oxygen therethrough.

A further aspect of the invention is directed to a method of providing an improved oxygen and moisture resistance onto at least one surface of a substrate comprising:

a) treating at least one surface of a substrate with a primer layer composition; said primer composition comprising:
  i) at least one aqueous polyurethane dispersion (A); and
  ii) at least one crosslinking agent (B);
b) drying the primer;
c) coating at least one surface of the primer layer with a barrier layer composition;
said barrier layer composition comprising:
  i) at least one aqueous polyvinyl alcohol or its copolymers (C); and
  ii) at least one crosslinking agent (D); and
d) drying the coated substrate.

A still further aspect of the invention comprises packaging film structures having excellent oxygen and moisture barrier properties. The film structures of the present invention have been found to be useful in packaging food and pharmaceutical products in which it is important to preserve the freshness, flavor or odor of the foodstuff contained within the package.

Other aspects, objects, features and advantages of the present invention would be apparent to one of ordinary skill in the art from the following detailed description illustrating the preferred embodiments of the invention.

DETAILED DESCRIPTION OF THE INVENTION

The following glossary is provided as an aid to understand the use of certain terms herein. The explanations provided in the glossary are for illustrative purposes and do not limit the scope of the invention.

The term "primer" or adhesion promoter as used herein will be understood by those skilled in the art to mean coatings which are formulated to promote adhesion between layers of two materials. The primer is applied to the substrate which is then coated with the barrier layer before the water dispersible crosslinking agent in the primer coating is fully reacted. The crosslinking agent reacts with the amine functionality at a faster rate than with the hydroxyl functionalities present resulting in improved adhesion due to crosslinking. Suitable primers employed in the present invention include an aqueous dispersion of polyurethane and at least one water dispersible crosslinking agent.

For purposes of the invention, "polyvinyl alcohol and its copolymers" includes polymers or copolymers of polyvinyl alcohol, ethylene vinyl alcohol copolymers and mixtures thereof.

The primer composition comprises at least one aqueous dispersion of polyurethane (A) and at least one crosslinking agent. The crosslinking agent includes a polyfunctional isocyante or a polyfunctional aziridine.

The aqueous dispersion of polyurethane (A) employed in the present invention comprises polyurethane which is an isocyanate terminated polyurethane prepolymer dispersed in water and optionally reacted with amine chain extenders or amine chain terminators. Suitable amine chain extenders include water soluble polyamines. The polyamine component can be selected from the group consisting of diamines, triamines and mixtures thereof. Examples include hydrazine, substituted hydrazines, ethylene diamine, propylene diamine, butylene diamine, hexamethylene diamine, cyclohexylene diamine, piperazine, 2-methyl piperazine, phenylene diamine, tolylene diamine, xylyldiamine, tris (2-aminoethyl) amine and diethylene triamine. The preferred water soluble polyamines are ethylenediamine and diethylenetriamine. The water soluble polyamine components can be added to the aqueous medium at an equivalence ratio of amine active hydrogen to isocyanate in a range of from about 0.1:1.0 to about 0.89:1.0, and preferably from about 0.4:1.0 to about 0.8:1.0. The dispersion temperature during chain extension is in a range from about 20° C. to about 40° C., and preferably from about 35° C. to about 40° C. Amine chain terminator component can include aliphatic monoamines, aromatic monoamines and mixtures thereof. The preferred monoamine is monoethanolamine. The monoamine compounds can be added to the aqueous medium at an equivalence ratio of amine active hydrogen to isocyanate in a range from about 0.01:1.0 to about 0.8:1.0, and preferably from about 0.1:1.0 to about 0.5:1.0. The term "active hydrogen atoms" refers to hydrogens which display activity according to the Zerewitinoff test as described by Kohlerin J. Am. Chem. Soc., 49, 3181 (1927). The dispersion temperature during chain termination is in a range of from about 20° C. to about 40° C., preferably about 35° C. to about 40° C.

The polyurethane prepolymer comprises the reaction product of a polyol component and a diisocyanate component. The polyurethane dispersion has plural carboxylic or sulfonic acid groups on the polyurethane polymer which are neutralized with ammonia or organic amnine.

Particularly preferred polyurethane polymer dispersions are prepared from aliphatic polyisocyanate which are characterized by median particle sizes of about 80 nm or less, typically about 30–80 nm, preferably about 70 nm or less. Median particle sizes are determined conventionally, for instance, by the use of a BI-90 particle sizer sold by Brookhaven Instruments. The small particle size dispersion of the invention is almost clear and has improved application properties, especially using rotogravure application machinery.

In the preferred embodiments, the aliphatic isocyanate is a hindered isocyanate compound. The use of a hindered isocyanate helps prevent isocyanurate trimer formation during polymer manufacture and reduces the reactivity of residual isocyanate groups on the prepolymer. The hindered isocyanate can be any di-, tri- or polyfunctionat isocyanate having tertiary aliphatic isocyanate functionality. Representative non-limiting examples of such isocyanates include m-tetramethylxylene diisocyanate and p-tetramethylxylene diisocyanate. Other polyisocyanate containing at least one sterically hindered group such as isophorone diisocyanate (IPDI) are usually employed in the preferred embodiments.

The plural isocyanate compound is reacted with polyol component providing acid functionality that will permit formation of stable dispersions in aqueous amine solution. The acid functional polyol component may comprise a polyol having at least two isocyanate reactive hydrogen and at least one acid functional group or a combination of polyol, free of acid functionality having at least two isocyanate reactive hydrogens together with another compound having acid functionality and hydroxy, amine or thiol functionality.

Preferably, the polyhydroxy polymer compound or polyol used to make the prepolymer of the invention has a molecular weight of about 500 to about 3,000, preferably about 1,000 to about 2,000. Such polymers can be polyester condensation products of commercially available dicarboxylic acids and hydroxy compounds such as diols, triols, tetraols, etc. Additionally, such polymers can be polyether diols, triols, etc. based on polymers of ethylene oxide or propylene oxide.

The polyhydroxyl materials or polyols can be either low or high molecular weight materials and in general will have average hydroxyl values as determined by ASTM E 222-67, Method B, between about 1000 and 10 and preferably between about 500 and 50. The polyols include low molecular weight diols, triols and higher alcohols, low molecular weight amide containing polyols and higher polymeric polyol such as polyester polyol, polyether polyol and hydroxy containing acrylic interpolymer.

The polyol component of the prepolymer reaction may comprise an acid grafted polyether polyol such as polypropylene oxide grafted with for example, maleic or fumaric acid as taught in Frentzel, U.S. Pat. No. 4,460,738 or Knopf, U.S. Pat. No. 4,528,334 and are incorporated herein by reference. Other polyester polyols produced from mixtures of di- and tri- or higher functional acid and polyol components in ratios which provide residual acid functionality as well as plural hydroxy groups may be employed.

Alternatively, polyol component comprises a mixture of a polyol free of acid functionality and an acid functional compound having hydroxy, amine or thiol functionality. Suitable acid functional compounds include hydroxy and mercaptocarboxylic acids, aminocarboxylic acids, aminohydroxycarboxylic acids, hydroxysulfonic acids, amninosulfonic acids and aminohydroxysulfonic acids. Representative non-limiting examples of such acids include dimethylolpropionic acid, glycolic acid, thioglycolic acid, lactic acid, maleic acid, dihydroxymaleic acid, tartaric acid, dihydroxytartaric acid, 2,6-dihydroxybenzoic acid, oxaluric acid, anilidoacetic acid, glycine, aalanine, 6 aminocaproic acid, the reaction products of ethanolamine and acrylic acid, hydroxyethylpropionic acid, 2 hydroxyethanesulfonic acid and sulphanilic acid.

Desirably, the polyurethane prepolymer has sufficient acid groups to provide an acid number of between about 10 and 30, preferably between about 14 and 16.

Where flexible and elastomeric properties are desired, the polyurethane prepolymer should preferably contain at least a portion of a higher molecular weight polymeric polyol, i.e., absence of trifunctional or higher functionality ingredients, to avoid any chance of gelling the resultant polymeric product and should have a hydroxyl number of about 200 or less, preferably within the range of about 150 to 30.

The most suitable polymeric polyols include polyalkylene ether polyol including thioethers, polyester polyols including polyhydroxypolyesteramides, and hydroxy containing polycaprolactones and hydroxy containing acrylic interpolymers.

Any suitable polyalkylene ether polyol may be used. Included are polyoxytetramethylene glycol, polyoxyethyleneglycol, polypropylene glycol and the reaction products of ethylene glycol with a mixture of propylene oxide and ethylene oxide.

Also useful are polyether polyols formed from the oxyalkylation of various polyols. For example, glycols such as ethylene glycol, 1,6 hexanediols, Bisphenol A and the like, higher polyols such as trimethylolpropane, trimethylolethane, pentaerythritol and the like. Polyols of higher functionality which can be utilized as indicated can be made for instance by oxyalkylation of compounds such as sorbitol or sucrose. One commonly utilized oxyalkylation method is by reacting a polyol with an alkylene oxide, for example, ethylene or propylene oxide in the presence of acidic or basic catalyst.

Polyester polyol can be used as a polymeric polyol component in the practice of this invention. The polyester polyol can be prepared by polyesterification of organic polycarboxylic acid or anhydride thereof with organic polyols. Usually, the polycarboxylic acid and polyol are aliphatic or aromatic dibasic acids and diols. Suitable polyester polyols are sold by Ruco Corp. under Rucoflex® trademark including Rucoflex 1011, 1019, 108, 1015, 1035, 1040, 101, 102, 1037 and 1095.

The diols that are usually employed in making the polyester include alkylene glycols such as ethylene glycol and butylene glycol, neopentyl glycol and other glycols such as hydrogenated Bisphenol A, cyclohexanediol, cyclohexanedimethanol, caprolactone and ethylene glycol) hydroxyalkylated bisphenols, polyether glycols, for example poly(oxytetramethylene)glycol and the like. However, other diols of various types and polyols of higher functionality can also be utilized. Such higher polyols can also include for example, trimethylolpropane, trimethylethane, pentaerythritol and the like as well as higher molecular weight polyols such as those produced by oxyalkylating low molecular weight polyol is the reaction product of 20 moles of ethylene oxide per mole of trimethylol propane.

In a preferred embodiment, the polyfunctional polyol compound is reacted with hindered aliphatic polyfunctional isocyanate in the presence of a strong catalyst at a temperature of from about 40 to 140° C., more preferably from about 50° to 120° C. and most preferably from about 60 to 100° C. A representative non-limiting list of catalysts which may be used to drive this reaction include t-amines, organometallics such as dibutyltinlaurate, tin oleate, lead naphthanate, etc. Tin catalysts are preferred. The hindered isocyanate can be reacted with polyol at an isocyanate OH ratio of about greater than 1.1 moles of isocyanate per mole of OH and most preferably about 1.4 to 1.7 moles isocyanate per mole OH. When small molecule polyol with pendant acid functionality is used with acid free polyol, the acid component can be added at a rate of about 5 to 15 wt % of the polyol.

The polyurethane polymer is suitably stabilized in dispersion by neutralization of the acid functional groups on the polymer with an ammonia or an organic amine such as tertiary amine compound. Suitable tertiary amine compound has three aliphatic substituents. Such substitutents can be $C_{1-5}$ alkyl groups which may be optionally cyclic aliphatic groups. The tertiary amine may also be cyclic aliphatic amine compound. Specific examples of tertiary amine include trimethylamine, triethylamine, tri-n-propyl amine, tri-n-butyl amine, N-methylpiperidine, N-ethylpiperidine, ethyldipropylamine, N-ethylpiperidine, N-methylpyrrollidone and the like.

The conversion of the carboxylic or sulfonic acid groups in the prepolymer to ionic salt groups can be achieved before, simultaneously with or after prepolymer dispersion in water.

The polyurethane polymer dispersion preferably has a solids content of from about 10 to about 80 wt %, preferably from about 20 to about 60 wt % and most preferably from about 30 to about 40 wt %. Further, the polymer dispersion has a low viscosity of from about 25 to 2,000 cps, preferably from about 50 to about 1,000 cps and most preferably from about 25 to 300 cps.

The aqueous dispersion of polyurethane is used in the invention with a water dispersible polyfunctional crosslinking agent (B) to produce the primer composition. The addition of the crosslinking agent provides improvements in adhesion, heat resistance, water resistance and moisture resistance of the oxygen and moisture resistant barrier film structures. Polyfunctional crosslinking agents employed include polymers containing polyfunctional isocyanate or polyfunctional aziridines.

Suitable isocyanate compounds for the preparation of polyurethane or for use as crosslinking agent are polyfunctional isocyanate compounds having at least two or more isocyanate groups. Representative organic diisocyanates suitable for the primer coating are aromatic diisocyanates such as 2,4 tolylene diisocyanate, methylene-bis-p,p'-phenylene diisocyanate, 1,5-naphthalene diisocyanate, polymethylene diisocyanate such as tetramethylene diisocyanate, pentamethylene diisocyanate, hexamethylene diisocyanate, decamethylene diisocyanate, cycloalkylene diisocyanate such as cyclohexylene 1,4-diisocyanate, diisocyanates containing heteroatoms in the chain such as OCN $(CH_2)_2O(CH_2)_2NCO$ and $OCN(CH_2)_3O(CH_2)_3NCO$ and mixed isocyanates-isothiocyanates such as 1-isocyanate,6-isothiocyanate hexane. Other examples include toluenediisocyanate (TDI), triphenylmethanetriisocyanate (TTT), isophoronediisocyanate (IPDI), tetramethylxylenediisocyanate (TMXDI) or polymers or derivatives thereof If the polyfunctional isocyanate is used, it is present in an amount of about 0.1% to about 30% by weight, preferably about 2% to about 15% by weight, more preferably about 2% to about 5% by weight.

Another crosslinking agent which may be used is a polymer containing polyfunctional aziridine. The term "aziridine" as used herein refers to alkyleneimine and "polyfunctional aziridine" includes a compound produced by the polymerization of a compound having the following structure:

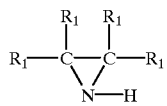

wherein $R_1$ is a hydrogen, an alkyl radical having 1 to 3 carbon atoms, phenyl or combinations thereof Furthermore, polyfunctional aziridine include any compound having two or more of the following moiety:

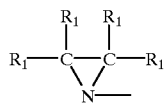

wherein $R_1$ is as described above. Such aziridines include ethyleneimine, ethylethyleneimine and propyleneimine. The aziridne compound of the present invention also include polyfunctional aziridine. Useful polyfunctional aziridines are compounds having two or more aziridinyl groups. They include but are not limited to 2-[3-(1-aziridinyl) propionyloxymethyl]1,3-bis[3-(2-methyl-1-aziridinyl) propionyloxymethyl]-2-ethylpropane (CAS64265-57-2). These materials are available commercially from Zeneca Resins, Inc. or prepared using known methods.

Examples of suitable plural aziridine compounds include trimethylolpropane-tris-(-β(N-aziridinyl) propionate, pentaerythritol-tris-β-(N-aziridinyl)-propionate and 1-aziridinepropanoic acid, 2-methyl-, 2-ethyl-2[[3-(2-methyl-1-aziridinyl)-1-oxopropoxy]methy]-1,3-propanediyl ester. The two polyfunctional aziridine which are commercially available from Virginia Chemicals (Portsmouth, Va.) as XAMA-2 and XAMA-7 respectively. XAMA-2 has a solids content of 100% and aziridine content of 6.0 to 7.0 meg/g, an aziridine functionality of about 2.7, a density at 25° C. of 1.109 g/ml, a viscosity at 25° C. of 125–500 cps, a freezing point of less than –15° C., a vapor pressure of less than 0.1 mm and a solubility in water of 6.5 weight %. XAMA-7 has a solids content of 100% and aziridine content of 6.35 to 6.95 meg/g, an aziridine functionality of about 3.3, a density at 25° C. of 1.185 g/ml, a viscosity at 25° C. of 1200–2000 cps, a freezing point of less than –10° C. and is completely miscible in water.

Other polyfunctional aziridines include 2,2-bis-hydroxymethylbutanol-tris[3-(1-aziridinyl)propionate] such as Chemitite PZ-33; hexamethylenediethyleneurea (Chemitite HZ-22, diphenylmethane bis-4,4'-N,N'-diethyleneurea (Chemitite DZ-22) from Nippon Shokubai Kagaku Kogyo Co. Ltd.

The crosslinking agent is added to the aqueous polyurethane dispersion of the invention prior to the application of the mixture to the substrate. Suitable crosslinking agents such as polyfunctional aziridine compound is present in an amount of about 1% to about 5% by weight based on the polyurethane polymer solids content, preferably about 1% to about 2%.

The crosslinking agent may be added to the polyurethane dispersion neat or as a solution or dispersion. After the addition of the crosslinking agent to the aqueous polymer dispersion but before curing, the viscosity of the blended adhesive is about 25 cps and more preferably, about 200 cps. The blended primer composition preferably contains from about 20% to about 60 wt % solids and more preferably from about 35% to about 40 wt % solids.

The barrier layer composition comprises at least one aqueous polyvinyl alcohol and its copolymers (C) and at least one crosslinking agent (D).

Polyvinyl alcohol is typically produced by hydrolyzing polyvinyl acetate. Specifically, the hydrolysis reaction replaces the acetate groups with alcohol groups. The more acetate groups that are replaced, the greater the hydrolysis of the PVOH. It is believed that the greater the degree of hydrolysis, thus the presence of more alcohol groups, the better the barrier properties.

Even after the hydrolysis of the PVOH, a number of acetate groups remain attached to the PVOH molecule. For example, in a 95% hydrolyzed PVOH, approximately 5% of the originally present acetate groups remain attached to the molecule, while in a 99% hydrolyzed PVOH, approximately 1% of the originally present acetate groups remain attached to the molecule.

PVOH may be produced with various viscosities and various degrees of hydrolysis. Viscosity is typically a function of the molecular weight of PVOH. Specifically, a solution of PVOH in which individual molecules are relatively large, i.e., high molecular weight PVOH tends to have a higher viscosity than a solution of PVOH in which individual molecules are relatively small, i.e., low molecular weight PVOH. It is believed that van der Waals forces develop between the larger sized molecules because such molecules tend to align themselves with one another, thus increasing the viscosity of PVOH.

A commercially available PVOH such as Elvanol 71–30 from E. I. Dupont is typically referred to as medium viscosity, fully hydrolyzed PVOH. Specifically, the degree of hydrolysis of a fully hydrolyzed PVOH is 98%. Further, the viscosity is about 30 cps at 4% solution and 20° C.

Another commerically available PVOH is Elvanol 75–15 which is a low viscosity, fully hydrolyzed PVOH. Specifically, the degree of hydrolysis is 98% and the viscosity is about 13 cps at 4% solution and 20° C.

Still another commercially available PVOH is Elvanol 90–50, a low viscosity, superhydrolyzed PVOH. The degree of hydrolysis is about 99.5%. The viscosity is about 13 cps at 4% solution and 20° C.

A preferable viscosity of PVOH is a viscosity of from about 5 cps to about 15 cps (at 4% solution and 20° C.).

The solution, which is preferably aqueous, is prepared by adding PVOH to cold water which is hereafter heated to a temperature sufficient to dissolve PVOH. The water and dissolved PVOH are then cooled. The crosslinking agent, which includes a polymer having a polyfunctional amine or polycarboxylic acid, is added to the solution. The resulting solution is coated on the polymeric substrate.

In a preferred embodiment, the aqueous solution of PVOH includes from about 5% to about 25% by weight of solids, preferably about 5% to about 20% by weight of solids, more preferably, about 16% to about 18% by weight of solids. The application weight of the primer composition is about 0.1 to about 5.0 lbs. polymer solids/3000 ft². The application weight of the barrier composition is about 0.3 to about 5.0 lbs. polymer solids/3000 ft².

The crosslinking agents for the barrier layer include polymers containing polyfunctional amines and mixtures thereof.

Polyfunctional amines include ethylenediamine, propylenediamine, diethylenetriamine, triethyltetramine, tetraethylpentamine, pentaethylenehexamine, polyethyleneimine, β-(4-aminophenyl) ethylamine, β-(2,4-6 triaminophenyl) butylamine, β-(2,4-diaminophenyl) hexylamine, melamine, melamine derivatives and mixtures thereof.

Melamine and melamine derivatives include compounds having the formula (I)

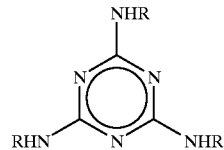

wherein R may be identical or different, represents a hydrogen, a hydroxy containing $C_1$–$C_4$ alkyl group, a straight chain or branched chain $C_1$–$C_4$ alkyl or alkenyl group or a $C_3$–$C_7$ or the group

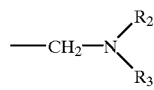

$R_2$ and $R_3$ may be identical or different, represents a hydrogen, a straight chain or branched chain $C_1$–$C_4$ alkyl or alkenyl group or a $C_3$–$C_7$, preferably a $C_5$–$C_6$ cycloalkyl group. Examples include 1,3,5-triamino-2,4,6 triazine (melamine), melamine formaldehyde, alkylated melamine formaldehyde such as methylated, ethylated, propylated or butylated melamineformaldehyde. Commercial melamine derivatives include melamine formaldehyde such as Parez™ 613 and Cymel™ 373, Cymel™ 385, methylated melamine formaldehyde, dimethylol melamine formaldehyde; trimethylol melamine urea formaldehyde such as Cymel™ 401.

A preferred polyfunctional amine is polyethyleneimine (PEI) which promotes adhesion due to the attraction between its cationic functionality and anionic functionality of the substrate. A commercially available polyethyleneimine is Polymin P, from BASF Wyandotte Corporation. Other commercially available polyethyleneimine includes high molecular weight PEI such as Corcat™ P-600, Lupasol™ P, Lupasol™ water free and Epomin™ P-1000. Low molecular weight PEI include Lupasol™ FG and modified PEI such as Lupasol™SC-86X.

Crosslinking is carried out not only to make the polyvinyl alcohol less oxygen transmissive and less moisture sensitive but also to provide an unexpectedly strong bond between the contacting primer layer and barrier layer or a second contacting layer. A significant latent crosslinker functionality remains until the primer and barrier layers are brought into contact. This is enhanced by making up the aqueous solution so that initial concentration is too low for this to occur but as drying occurs, the concentration increases and the rate of crosslinking is heightened. This provides adequate time to bring the surfaces together.

The crosslinking agent is preferably provided as an aqueous solution or dispersion for ease of mixing with the PVOH which is also preferably provided in an aqueous solution. The PVOH and crosslinking agent are admixed, preferably in aqueous solution. The crosslinking agent is used in an amount of about 0.1% by weight, preferably about 30% by weight. If polyethyleneimine is used, the amount employed is about 0.01% to about 4% by weight, preferably about 0.05% to about 3%, most preferably about 0.5% to about 1% by weight. If melamine, melamine derivatives or combinations thereof is used, the amount employed is about 0.25% to about 10% by weight, preferably, about 0.5% to about 8% by weight, most preferably about 2% to about 5% by weight.

The primer dispersion is applied to at least one side of the substrate film utilizing standard coating techniques so that a dry coating weight of from about 0.1 up to about 5.0 lbs/3000 ft² of film is obtained. The coated film is subsequently passed through a hot air oven to completely remove the water present. The drying time is dependent upon the coat weight, line speed and oven temperature. For example, the residence time in the oven is from about 1 to about 6 seconds at about 60 to 200° F. The barrier dispersion is applied so that a dry coating weight of from about 0.01 up to about 10 lbs/3000 ft² of film is obtained, preferably about 0.01 to about 7 lbs/3000 ft² of film, most preferably about 0.01 up to about 6 lbs/3000 ft² of film. The coating is applied utilizing standard techniques such as gravure, roll coating and the like. The film is subsequently dried through a conventional hot air oven.

The barrier layer may have a thickness of from about 0.01 to 100 μm and preferably from about 0.01 to about 50 μm. The amount of barrier layer applied to the substrate may be varied over a wide range depending upon the specific properties desired in the final film product. It is surmised that a too thin layer can not prevent a lowering of gas barrier properties of the film layer while a too thick layer may cause cracks in the barrier layer itself.

Since permeability is a function of diffusion, a thicker coat weight slows permeability. Thus, varying the film thickness affects the oxygen and moisture vapor transmission rate. The oxygen permeability may be adjusted to optimum levels according to the different applications. For example, food products such as potato chips require minimum permeability while some produce, such as lettuce, requires a higher permeability but in controlled ranges.

If desired, the coating composition of the present invention may include other auxiliary substances which may be added to the final composition in relative amounts in order to impart desirable properties or to suppress undesirable properties. Examples of such substances include viscosity modifiers, dispersant, fillers, plasticizers, pigments, dyes, wetting agents, heat stabilizers, carbon black, silica sols, leveling agents, antifoaming agents, UV-stabilizers and the like. The composition may also be blended with other polymer dispersions such as polyvinyl acetate, epoxy resins, polyethylene, polybutadiene, polyvinyl chloride, polyacrylate and other homopolymer and copolymer dispersions.

The polymeric material contemplated as the substrate in the present invention includes any polymeric film oriented or unoriented which inherently permits oxygen transmission and wherein the utility of such films would call for a minimization of the oxygen transmission. In most cases, the source of oxygen referred to is atmospheric oxygen. Suitable substrates include nylon, biax nylon; metallocenes; polyester such as polethylene terephthalate (PET), polyester copolymer of terephthalic acid, TYVEC™ from Dupont, ethylene glycol and cyclohexane dimethanol (PETG) from Eastman Chemical, and metallized PET; polycarbonate films; polyvinyl chloride (PVC); polyvinylidene chloride (PVDC); polystyrene (PS), high impact polystyrene (HIPS) from Dow Corning; Barex™ (heat resistant acrylonitrile) from Goodrich; XT polymer, PRIMACOR™ (ethylene acrylic acid copolymer) from Dow Chemical; and polyolefins. A particularly preferred substrate is polyolefin. Within the polyolefin class, homopolymers or copolymers of propylene, low density polyethylene (LDPE), linear low density polyethylene (LLDPE), high density polyethylene (HDPE) may also be used.

The lamination of the gas barrier film can be performed by any known laminating process such as coating process or dry lamination process. In the coating process (including casting), a mixture of PVOH and the crosslinking agent is coated on a layer of the substrate to a predetermined thickness by means of an air knife coater, kiss roll coater, metering bar coater, gravure roller coater, reverse roll coater, dip coater or die coater, one or more stations of a central impression (CI) or stack type flexographic printing press or combination thereof Water in the solution thus coated is then evaporated by blowing of heated air, infrared irradiation or the like using an arch dryer, straight bath dryer, lower dryer or drum dryer or combination thereof Thereafter, the film is heat treated.

Conditions for the heat drying that follows the coating may vary depending upon the amount of the components contained in the water based coating composition used. Since the heat drying may be carried out at a temperature that may cause no pinholes, the heat drying is carried out at a temperature of from about 60° to about 200° F., preferably from about 80° to about 180° F. for a period of about 2 to about 8 seconds, preferably about 3 to about 4 seconds in the gravure press.

The polymeric substrate can be of any desired thickness, although thickness will typically range from about 0.5 to about 2.0 mils to ensure good machinability on high speed packaging equipment. The oriented polypropylene preferably has a thickness of about 1.0 mil.

When a higher barrier or a stronger packaging film is required, the crosslinked PVOH may be laminated to another film that provides improved strength and barrier. Such films include PET, nylon, and polyolefins. For sealability, either surface must be further laminated or coated with a layer of polyethylene or hot melt.

Once the laminate material is formed, the manufacture of bags, pouches and like containers is within one of the ordinary skill in the art. For example, an essentially rectangular sheet of the present laminate may be folded at its approximate midpoint. Any two free sides are then joined by the application of heat sufficient to heat seal their edges. This technique results in a four sided envelope construction which may then be filled with the desired contents prior to heat sealing of the remaining edge. In the alternative, a container can be manufactured by placing two separate sheets of the laminate face to face and heat sealing the adjoining polyolefin film surface and heat sealing the adjoining polyolefin film surface along the edges thereof The container can be filled through the opening present at the unsealed edge, if only three edges are initially heat sealed. A final closed package results by heat sealing the opening.

In packaging materials, heat sealing is generally used. Examples of sealing layer capable of heat sealing include layers formed from polyolefins such as low density polyethylene, linear low density polyethylene, high density polyethylene, ethylene vinyl acetate copolymers, polypropylene, ethylene acrylic acid copolymers and ethylene ethyl acrylate copolymers, nylon copolymers such as nylon 6/66 copolymers and nylon 6/12 copolymers and the like. Coated sealant layers include gravure, extrusion, roll or slot applied hot melt coating at about ¾ to 1 mil coat weight. At ¾ of a mil coat weight, the moisture vapor transmission rate properties are enhanced due to the wax component present in the hot melt formulations. Hot melt formulations are applied to the adherent in the molten state when hot, in the absence of a solvent and subsequently solidify on cooling. Hot melt formulations are based on a variety of thermoplastic polymer such as ethylene vinyl acetate polymers, atactic polypropylene, acrylic polymers, polyamide, amorphous polyolefin/polypropylene, polyester, natural and synthetic rubbers and others. In addition, the hot melt formulation includes a tackifying resin and wax.

Sealing methods of the packaging material generally include heat sealing, impulse heat sealing, high frequency sealing, ultrasonic sealing and the like. Therefore, the sealing layer may desirably be formed from a thermoplastic fit for the sealing method used. Heat sealing is conducted by means of an ordinary heat sealer such as a bar type heat sealer and impulse heat sealer by contacting two laminate films, e.g. polyethylene, facing each other. The sealing pressure is ordinarily about 0.2 to 2 $kg/cm^2$ and the seal temperature is at least about 100 to about 200° C.

It is expected that the films of the invention will have a variety of uses and applications within the packaging industry for containing foods and beverages, pharmaceutical products or other consumer items such as oxygen sensitive sealants.

The invention is useful for extending the useful life of vegetables or fruit produce such as lettuce, cabbage, celery, cauliflower, broccoli, parsley, green onions, strawberries and the like. More particularly, cut vegetables benefit from the packaging. Shredded or chopped lettuce and cabbages are examples of such cut vegetables. Other applications include flexible walled pouches, bags, and similar containers in the packaging of products such as potato chips, corn chips, cookies and the like where it is essential that freshness of the product is maintained for a number of months.

Consumers prefer to visually inspect the contents of the packaged product prior to purchasing. Thus, it is desirable that the package be of sufficient clarity. If the packaging is cloudy or not sufficiently transparent or translucent, the food is less desirable to the consumer. In accordance with the present invention, the inventive films and packages exhibit excellent clarity and seal strength.

The inventive film and packages are also suitable for food service industry such as schools, restaurants, hospitals, fast food, etc. where appearance and seal strength are especially important, as well as long shelf life.

The invention is not necessarily limited by the product contained within the package made from the inventive film as the film can be used whenever a "breathable" package is desired. For the purpose of this invention, "breathable" package refers to a package where the film is laminated that has less transmission than an untreated film. The coat weight of the PVOH film can be adjusted from high to low coating weights to control the oxygen transmission rate and thus, the "breathability" of the film or package is adjusted in accordance with the "breathability" of the product. For example, chips get stale unless the transmission is very low while produce such as lettuce needs very small amount of barrier to produce a "breathable" package.

In packaging foodstuffs, the packages are generally imprinted on the outermost layer of the laminate from which the package is made. When the outermost layer is transparent, the printing thereon is often difficult to discern, particularly if the package contents do not provide sufficient contrast between the lettering and its background. Thus, printing is generally effected in reverse on the inner surface of the outer transparent layer of the laminate. Printing can be imparted to the film by flexographic or rotogravure apparatus with the ink employed preferably being suitable for food packaging.

The PVOH/primer system of the present invention comprises very optically clear films and do not interfere with the clear appearance of the finished package.

The gas barrier film of the present invention has high gas barrier properties, superior flexibility, water resistance, heat resistance, moisture resistance and sufficient clarity. The film can be improved in its mechanical strength when other resins are laminated together. Hence, no gas barrier properties can be lost even in an environment of high relative humidity and long term storage of contents such as food and pharmaceutical can be implemented without causing deterioration. In this regard, the gas barrier properties are not damaged when printing, laminating and bag making are applied to form the packages.

Humidity Resistance Test

The test is primarily applicable to coated films where the high level of heat seal strength between the coated surfaces is required. Two sets of heat sealed strips are prepared using any desired laboratory heat seal apparatus. One set is allowed to stand at ambient room conditions and the other is exposed to highly humid environment, e.g., 100° F. and 90% relative humidity. After a period of three days, the first set is separated by peeling with a conventional test equipment whereby the force required to peel one strip from the other can be measured quantitatively. The other test strip is removed from the environmental chamber and peeled immediately. The fraction of the peel strength remaining after exposure to high humidity is a measure of the effectiveness of the primer. Typically, formulations of this invention will show retention of greater than 75% of initial seal strength.

The test has a pressure component. Most packaging which requires an oxygen barrier is either gas flushed, vacuum packed or air filled to protect the chip integrity. The Mocon test is set up such that the PVOH is exposed to slight pressure of at least about 1 to about 2 psi. The amount of pressure would depend on the product being packaged. Both sides of the substrate would need exposure to pressure, e.g., polyethylene would result in a more severe test than polypropylene, since polypropylene has superior moisture barrier qualities than polyethylene.

Water Immersion Test

The effectiveness of the primer can be measured by immersing the strips of the film in water at room temperature. After 24 hours, the strips are removed, patted dry with paper toweling and a strip of pressure sensitive transparent tape is firmly applied, then stripped off. The fraction of the coating layer removed by the tape is estimated visually. Preferred formulations of the invention show little or no lifting of the coating layer.

Haze Test

The extent of haziness of the surface of the laminate film was determined as follows:

From a laminate film prepared according to the present invention, ten test pieces were cut and divided into two groups each consisting five pieces. The extent of the haziness of each of the five pieces of the first group was determined by a Haze meter (Tokyo Denshoku Co. Ltd. model TC-HIII as haze % in accordance with ASTM -D-1003-61 and the mean value thereof was designated as % of the laminate film. The five pieces of the second group were respectively floated for 10 minutes on the surface of hot water at 90° C. to which a small mount of lard had been added and after taking out from the hot water and removing the lard adhered to the surface thereof, the extent of haziness of the thus treated piece was measured as above. The mean value of haze (%) was designated as haze (%) of the thus treated laminate film.

Boiling Water Test

This very stringent test is performed in the same manner as the water immersion test except that boiling water is used and the immerison period is one hour. Generally, the preferred films made according to the present invention show little or no lifting of the coating.

Storage Stability

The storage stability of the gas barrier film structure is determined by evaluating barrier properties of test rolls of films at 100° F./90% RH over 30 days as compared to a control. Preferred formulations are stored at room temperature and at 50% RH or lower.

EXAMPLES

Example 1

On each surface of a polyethylene terephthalate (PET) film serving as as substrate, a thin film layer with a layer thickness of 0.5 to about 0.75 lbs/3000 ft$^2$ was coated with a primer composition comprising 95% polyurethane dispersion (WD-4047, commercially available from H.B. Fuller Co.) and a 3% water dispersible polyfunctional isocyante (WD-6318, commercially available from H.B. Fuller Co.) as a crosslinking agent. The primer coating composition is applied at 0.5 lbs/3000 ft$^2$. The barrier coating composition was applied by means of a bar coater followed by drying to form a barrier layer with a thickness of about 1.0 lb/3000 ft$^2$. The primer coating composition and barrier coating composition were prepared by mixing the following components in combination and proportion as shown below.

Example 2

Same as Example 1 except that the primer used is 98% polyurethane disperison (WD-4047) having 35% solids combined with 2% polyfunctional aziridine (XR2990).

A) Aqueous solution of polyurethane/polyfunctional isocyanate primer

A 97% of polyurethane dispersion (WD-4047)having 35% solids was combined with 3% water dispersible polyfunctional isocyanate (WD-6318) having 100% solids.

B) Aqueous solution of polyurethane/polyfunctional aziridine primer

A 98% of polyurethane dispersion (WD-4047) having 35% solids was combined with 2% polyfunctional aziridine (XR2990) having 100% solids.

C) Aqueous solution of PVOH/polyethyleneimine with an aqueous solution of heteropolyfunctional amine (melamine derivative)

A 95% of Airvol™ 103 (from Air Products & Chemicals), a polyvinyl alcohol having 15% solids was combined with 2% polyethyleneimine (Polymin P) having 60% solids and 3% Cymel™385, a methylated melamine/formaldehyde polymer having 80% solids.

Gas barrier properties of the gas barrier laminated materials obtained were evaluated by measuring their oxygen transmission and watervapor transmission. The oxygen transmission was measured in an environment of 23° C. using an oxygen transmission measuring device (Mocon Oxtran 10/40A, manufactured by Modern Controls Inc.) in accordance with ASTM F1307-90. Dry readings were taken in an environment where the relative humidity is 0%. The oxygen transmission rate is about 0.11 cc to about 0.15 cc/100 in$^2$/24 hrs. The wet readings were taken in an environment where the relative humidity is 50% and 90%. The oxygen transmission rate is about 0.15 to about 0.27cc/100 in$^2$/24 hrs and 0.28 to about 0.38 cc/100 in$^2$/24 hrs at 50% and 90% respectively. The watervapor transmission was measured in an environment of 40° C. and 90% RH using a water-vapor transmission measuring device (Permatran W6 by Modern Controls Inc.). All of the combinations in the Examples once dried produced clear coatings.

TABLE I

| Primer Composition | Barrier Composition | Oxygen Transmission Rate | | |
|---|---|---|---|---|
| | | 0% RH | 50% RH | 90% RH |
| A | C | 0.11 cc | 0.15 cc | 0.28 cc |
| B | C | 0.15 cc | 0.17 cc | 0.38 cc |
| Mobil 84AOH (Comparative) | | 0.1 cc | 1.22 cc | — |
| Dupont Mylar XM123 (Comparative) | | 0.05 cc | 0.12 cc | 62.0 cc |

The unit for cc is cc/100 in$^2$/24 hrs at 23° C.

The above examples have been depicted solely for the purpose of exemplification and are not intended to restrict the scope or embodiments of the invention. The invention is further illustrated with reference to the claims that follow thereto.

What is claimed is:

1. A method of providing an improved oxygen and moisture resistance onto at least one surface of a substrate comprising:
   a) coating at least one surface of a substrate with a primer layer composition; said primer composition comprising:
      i) at least one aqueous polyurethane dispersion (A); and
      ii) at least one crosslinking agent (B) selected from the group consisting of polyfunctional isocyanate and polyfunctional aziridine;
   b) drying the primer coated substrate;
   c) coating at least one surface of the primer layer with a barrier layer composition; said barrier layer composition comprising:
      i) at least one aqueous polyvinyl alcohol or its copolymers (C); and
      ii) at least one crosslinking agent (D) selected from the group consisting of polyethyleneimine, melamine, melamine derivatives and mixtures thereof; and
   d) drying the coated substrate.

2. The method according to claim 1 wherein the polyvinyl alcohol or its copolymers (C) comprises polymers or copolymers of polyvinyl alcohol, ethylene vinyl alcohol and mixtures thereof.

3. The method according to claim 1 wherein the polyurethane comprises an isocyanate terminated polyurethane prepolymer dispersed in water, optionally reacted with amine chain extenders or amine chain terminators.

4. The method according to claim 1 wherein the substrate is selected from the group consisting of polypropylene, polyethylene, polyester, polyethylene terephthalate, nylon, polyvinyl chloride, polyvinylidene chloride, metallocenes, biax nylon, metallized polyester and cast polyolefins.

5. The method according to claim 4 wherein the crosslinking agent (B) is a polyfunctional isocyanate selected from the group consisting of toluenediisocyanate, diphenylmethanediisocyanate, isophoronediisocyanate, hexamethylene diisocyanate, tetramethylxylenediisocyanate and derivatives thereof.

6. The method according to claim 1 wherein the amount of solids content of polyvinyl alcohol is about 5% to about 25%.

7. The method according to claim 1 wherein the coating step is accomplished by roll coating, gravure coating or flexographic coating.

8. An oxygen and moisture resistant barrier film structure for packaging comprising:
   a) at least one substrate;
   b) a primer layer formed by coating at least one surface of the substrate with a primer composition comprising:
      i) at least one aqueous polyurethane dispersion (A); and
      ii) at least one water dispersible crosslinking agent (B) selected from the group consisting of polyfunctional isocyanate and polyfunctional aziridine;
   c) an oxygen and moisture resistant barrier formed by coating onto said primed treated surface of the substrate, a barrier coating composition comprising:
      i) at least one aqueous polyvinyl alcohol or its copolymers (C); and
      ii) at least one crosslinking agent (D) selected from the group consisting of polyethyleneimine, melamine, melamine derivatives and mixtures thereof.

9. The film structure according to claim 8 wherein the polyvinyl alcohol or or its copolymers (C) comprises polymers or copolymers of polyvinyl alcohol, ethylene vinyl alcohol and mixtures thereof.

10. The film structure according to claim 8 wherein the substrate is selected from the group consisting of polypropylene, polyethylene, polyester, polyethylene terephthalate, nylon, polyvinyl chloride, polyvinylidene chloride, metallocenes, biax nylon, metallized polyester and cast polyolefins.

11. The film structure according to claim 8 wherein the polyurethane comprises an isocyanate terminated polyurethane prepolymer dispersed in water, optionally reacted with amine chain extenders or amine chain terminators.

12. The film structure according to claim 8 wherein the crosslinking agent (B) is a polyfunctional isocyanate selected from the group consisting of toluenediisocyanate, diphenylmethanediisocyanate, isophoronediisocyanate, hexamethylene diisocyanate, tetramethylxylenediisocyanate and derivatives thereof.

13. The film structure according to claim 8 wherein the barrier layer has a thickness in the range of about 0.05 to about 10.0 lbs polymer solids/3000 ft$^2$.

14. The film structure according to claim 8 wherein the primer layer has a thickness in the range of about 0.1 to about 5.0 lbs polymer solids/3000 ft$^2$.

15. The film structure according to claim 8 wherein the oxygen transmission rate is about 0.11 to about 0.38 cc/100 in$^2$/24 hrs at 23° C.

16. A heat sealable multi-layer structure comprising:
   a) a substrate having a first surface and a second surface; the second surface being opposite the first surface;
   b) a primer layer comprising at least one aqueous polyurethane dispersion (A) and at least one water dispersible crosslinking agent (B) applied directly on the first surface of the substrate;
   c) a barrier layer comprising at least one aqueous polvinyl alcohol or its copolymers (C) and at least one crosslinking agent (D) applied directly onto the primer layer; and
   d) a heat seal layer applied directly onto the first primer layer, wherein the first primer layer adheres together with the barrier layer and the seal layer.

17. A thermoplastic film substrate having a gas barrier coating (I) and a primer coating (II) according to claim 8, said barrier coating comprising the reaction product of
   a) at least one aqueous polyvinyl alcohol or its copolymers (C); and
   b) at least one crosslinking agent (D);

said film having a primer coating (II) intermediate said substrate film and said barrier coating (I), comprising the reaction product of a) at least one aqueous polyurethane dispersion (A); and
b) at least one water dispersible crosslinking agent (B).

18. A flexible pouch formed by heat sealing two parallel panels of the film structure of claim 8 along the edges of their respective inner heat sealable surfaces forming a space therebetween.

19. The method according to claim 1 wherein the crosslinking agent (D) is present in an amount of about 0.01% to about 4% by weight.

20. The method according to claim 1 wherein the crosslinking agent (D) is present in an amount of about 0.25% to about 10% by weight.

21. The film structure according to claim 1 wherein crosslinking agent (D) is present in an amount of about 0.01% to about 4% by weight.

22. The film structure according to claim 1 wherein crosslinking agent (D) is present in an amount of about 0.25% to about 10% by weight.

* * * * *